Figure 1:
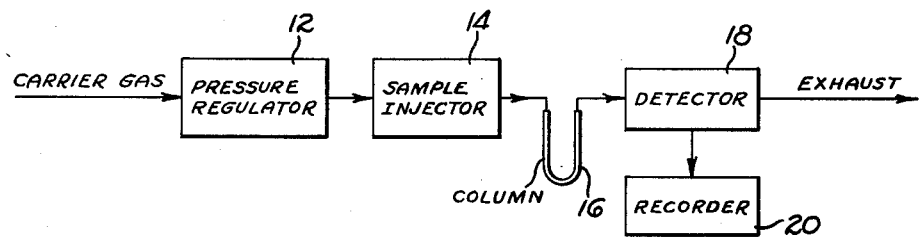

July 14, 1964     W. S. GALLAWAY ETAL     3,140,919
FLAME IONIZATION DETECTION OF MATERIALS
Filed April 24, 1961

INVENTORS.
WILLIAM S. GALLAWAY
RICHARD A. FOSTER
JAMES C. STERNBERG
RALPH A. DORA

BY THEIR ATTORNEYS.
HARRIS, KIECH, RUSSELL & KERN

3,140,919
FLAME IONIZATION DETECTION OF MATERIALS
William S. Gallaway, Fullerton, Richard A. Foster, La Habra, James C. Sternberg, Fullerton, and Ralph A. Dora, Anaheim, Calif., assignors to Beckman Instruments, Inc., a corporation of California
Filed Apr. 24, 1961, Ser. No. 105,013
7 Claims. (Cl. 23—232)

This invention relates to ionization detectors for use with gas chromatographs and the like, and provides an improved method or technique for the operation in particular of a flame ionization detector.

In general, the operation of a flame ionization type detector depends upon the ionization of components present in the effluent of a chromatographic column or other sample-containing gas stream. The gas stream is commonly mixed with hydrogen (a fuel) and introduced to a burner jet of the detector where the hydrogen fuel burns with the oxygen of the air, bringing about an ionization of the sample carried in the gas stream. The amount of ionization occurring in the flame provides a quantitative measure of the sample component present in the carrier gas stream. The hydrogen flame ionization detector is described in some detail by I. G. McWilliam and R. A. Dewar in Desty (Editor), Gas Chromatography, Amsterdam 1958, Academic Press, Inc., New York (1958).

It has not been possible to detect small or trace amounts of hydrogen found in a carrier gas stream using a hydrogen flame ionization detector. The use of hydrogen as a fuel has also proven objectionable in that hydrogen gives rise to serious corrosion problems where the sample is a halogenated material such as carbon tetrachloride. Perhaps the most serious objection to the use of hydrogen has been from the fire and safety viewpoint. The use of high pressure hydrogen tanks is frequently contrary to fire regulations and, as is well known, high pressure hydrogen leaking into air will spontaneously burn.

It has now been discovered that carbon monoxide (CO) used as the fuel gas in the operation of a flame ionization detector provides distinct advantages over hydrogen. It develops that the ionization occurring in flames of pure carbon monoxide is low and comparable to that found in the burning of pure hydrogen. This being so, the carbon monoxide flame presents a satisfactorily low background signal, making it suitable as a flame to be used for the ionization of an organic or other ionizable compounds carried by the carrier gas stream.

Surprisingly it has been observed that the ionization occurring in a carbon monoxide flame of samples containing no hydrogen, e.g., carbon tetrachloride, is comparable to the ionization occurring in the burning of such samples in a hydrogen flame. It has been postulated heretofore that the presence of hydrogen is necessary to ion formation in flames. The use of carbon monoxide as a fuel gas obviates the explosive hazard present in the use of hydrogen and in addition reduces the formation of corrosive hydrogen halides in the analysis of organic halogen compounds.

It has been found that when substantially dry carbon monoxide is used as a fuel to a flame detector that small amounts of water or hydrogen in the carrier gas may be detected, which is not possible with the use of hydrogen gas as fuel. Moreover, it has been observed that the addition of small amounts of water vapor or hydrogen to the carbon monoxide fuel mixture increases the sensitivity of the flame ionization detector to organic materials.

The only modification of the standard hydrogen flame ionization detector normally required is the substitution of a somewhat larger diameter burner jet. For example, a 0.070 inch inside diameter jet for a carbon monoxide flame has been found satisfactory for the gas volume flow rates for which a 0.016 inch inside diameter jet is commonly used with a hydrogen flame. However, the only requirement on burner diameter is that it be sufficient to maintain a stable flame at the gas flow rates employed.

In the operation of the burner jet having a 0.070 inch inside diameter of the preceding paragraph, it has been experienced that the carbon monoxide is preferably employed in the amount of 20 to 60 cc. per 60 cc. of air, although larger and smaller amounts of CO may be used to a less advantage. The volume ratio of carbon monoxide to carrier gas varies greatly with change in dimensions of the burner jet and even as to a particular burner jet design the amount of carbon monoxide that may be used will vary widely. It is conceivable in some applications to utilize carbon monoxide as both the carrier gas and fuel. The minimum amount of carbon monoxide is that required to provide minimum flame velocity equal to the linear flow velocity of the gas through the jet burner. Without the foregoing minimum amount of carbon monoxide, extinguishment of the flame will occur.

The foregoing objects and advantages of the invention, together with various other objects and advantages will become evident to those skilled in the art in light of the following disclosure and drawing. The drawing shows and the description describes a preferred embodiment of the process of the present invention.

Figure 2:
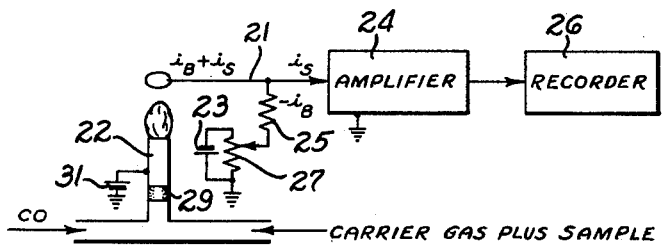

In the drawings:

FIG. 1 is a block diagram illustrating the use of a flame ionization detector with a gas chromatograph; and FIG. 2 is a schematic representation of a flame ionization detector employing carbon monoxide for its fuel.

The use of carbon monoxide in a flame ionization detector is described herein in conjunction with a gas chromatograph, but it is not limited to such application and can be used in the analysis of any gas stream having an ionizable component. The detector may be used to monitor impurities during preparation of noble gases in air pollution measurements, and in explosive vapor detectors and the like. FIG. 1 shows a typical arrangement of a gas chromatograph including a pressure regulator or flow controller 12, a sample injector 14, a chromatographic column 16, a detector 18 and a recorder 20. The flow of a carrier gas, ordinarily helium although other gases such as argon, nitrogen and even air may be used, is controlled by the pressure regulator 12. At a particular time a quantity of sample is injected into the carrier gas at the sample injector 14 and components of the sample are separated as the sample moves through the column 16. The detector 18 provides an output indicating the presence of a sample component in the column effluent; said output may be used as a quantitative measure of the component. The detector output is ordinarily recorded in some form for subsequent review, although the output may merely be indicated for contemporaneous visual inspection.

A typically flame ionization detector is illustrated schematically in FIG. 2 and comprises a burner jet 22 into which streams of carbon monoxide and carrier gas enter. The carrier gas carries the sample component. Both the carbon monoxide and the carrier gas within the flame undergo little ionization, with the result that the background current, $i_B$, is relatively small. When the carrier gas presents the sample component to the flame, there occurs at that time significant ionization which prompts the flow of a considerably larger current $i_S$ through a lead 21 to an amplifier 24. It is desirable and is the normal practice to provide a bucking current, $-i_B$, in opposition to the background current $i_B$ in order that only the sample current $i_S$ is indicated in the meter 24. The bucking current may be provided by a battery 23 through a resistor 25 to the amplifier lead 21. The necessary fraction of potential from the battery 23 is provided by a potentiometer 27. The burner jet 22 which is separated from the intake lines by an insulator collar 29 is connected through a battery 31 to ground, which battery provides a polarizing voltage. A suitable recorder 26 is provided for permanently recording the current flow.

Sometimes it is advantageous to supply a small amount of hydrogen to the carbon monoxide to improve the sensitivity of the detector to organic materials and to stabilize the flame by increasing burning velocity. It has been found that the addition of 5% by volume of hydrogen to the carbon monoxide increases response by a factor of about five. Combined fuel streams of carbon monoxide and hydrogen in the volume ratio of two carbon monoxide to one hydrogen have been noted to provide a response to organic samples about 25% higher than obtained with pure hydrogen fuel.

In one modification of the process of the invention, the carbon monoxide is prepared in situ by passing oxygen or air over carbon heated to red heat. This modification affords hydrocarbon-free carbon monoxide, containing small but harmless amounts of carbon dioxide and oxygen. By manufacturing the carbon monoxide in situ the toxicity hazard associated with carbon monoxide is appreciably reduced. As mentioned before, the flame detector, using either tank carbon monoxide or carbon monoxide prepared as needed, is particularly well suited to industrial gas chromatograph and hydrocarbon analyzer applications in locations where fire and explosive hazards would limit the use of hydrogen. Additionally, the use of carbon monoxide markedly reduces the formation of corrosive hydrogen halides in the analysis of organic halogen compounds.

Although an exemplary embodiment of the invention has been disclosed herein for purposes of illustration, it will be understood that various changes, modifications, and substitutions may be incorporated in such embodiment without departing from the spirit of the invention as defined by the claims which follow.

We claim:
1. In the operation of a flame ionization detector, the improvement comprising:
   utilizing carbon monoxide as fuel in the flame.
2. In an ionization method for quantity detection of a component contained in a carrier gas stream wherein a fuel gas stream is mixed with said carrier gas stream and the combined stream subsequently combusted, the improvement comprising:
   employing carbon monoxide as the major constituent in the fuel gas stream.
3. A method in accordance with claim 2 wherein the carbon monoxide contains a small amount of water.
4. A method in accordance with claim 2 wherein the carbon monoxide contains a small amount of hydrogen.
5. In a chromatography process employing an ionization detector for quantity detection of a component contained in a carrier gas stream flowing from a gas chromatograph column to the ionization detector and wherein a fuel gas stream is mixed with the carrier gas stream from the column and subsequently the combined stream combusted in the ionization detector, the improvement comprising:
   employing carbon monoxide as the major constituent in the fuel gas stream.
6. A method in accordance with claim 5 wherein the carbon monoxide contains a small amount of water.
7. A method in accordance with claim 5 wherein the carbon monoxide contains a small amount of hydrogen.

References Cited in the file of this patent
UNITED STATES PATENTS

| | | |
|---|---|---|
| 2,511,177 | Richardson | June 13, 1950 |
| 2,622,967 | Lobosco | Dec. 23, 1952 |
| 2,991,158 | Harley | July 4, 1961 |

OTHER REFERENCES

Baddiel et al.: "Chemistry and Industry," page 1154, No. 37, Sept. 10, 1960.